United States Patent [19]

Laprade et al.

[11] 4,091,783

[45] May 30, 1978

[54] DEVICE FOR THE REGULATION OF THE FUEL-AIR MIXTURE OF AN INTERNAL COMBUSTION ENGINE

[76] Inventors: Bernard R. Laprade; Xavier J. Laprade, both of 64260 Arudy; Pierre J. Gelé, 3, rue Vaussenat, Tarbes, all of France

[21] Appl. No.: 693,729

[22] Filed: Jun. 7, 1976

[30] Foreign Application Priority Data

Jun. 18, 1975 France .............................. 75 19076

[51] Int. Cl.$^2$ ............................................ F02M 23/04
[52] U.S. Cl. .............................. 123/124 B; 123/119 D
[58] Field of Search ........ 123/124 B, 119 EC, 119 D; 261/63

[56] References Cited

U.S. PATENT DOCUMENTS 3,931,710  1/1976  Hartel ............................ 123/119 D
3,977,375  8/1976  Laprade ......................... 123/124 B
4,007,718  2/1977  Laprade ......................... 123/124 B

*Primary Examiner*—Ronald H. Lazarus
*Attorney, Agent, or Firm*—Finnegan, Henderson, Farabow & Garrett

[57] ABSTRACT

A device for the regulation of the air-fuel mixture of an internal combustion engine, comprising two capsules, each divided into two chambers by an element which is movable in response to a pressure difference between the two chambers, the two movable elements being connected to each other and to a valve which regulates a gas inlet to the manifold, the two chambers of one capsule being subject respectively to the static and dynamic pressures in an inlet pipe to the manifold and the two chambers of the other capsule being subject to the pressure in the manifold and a valve for altering the pressure in one of the four chambers in response to the composition of the exhaust gases.

16 Claims, 6 Drawing Figures

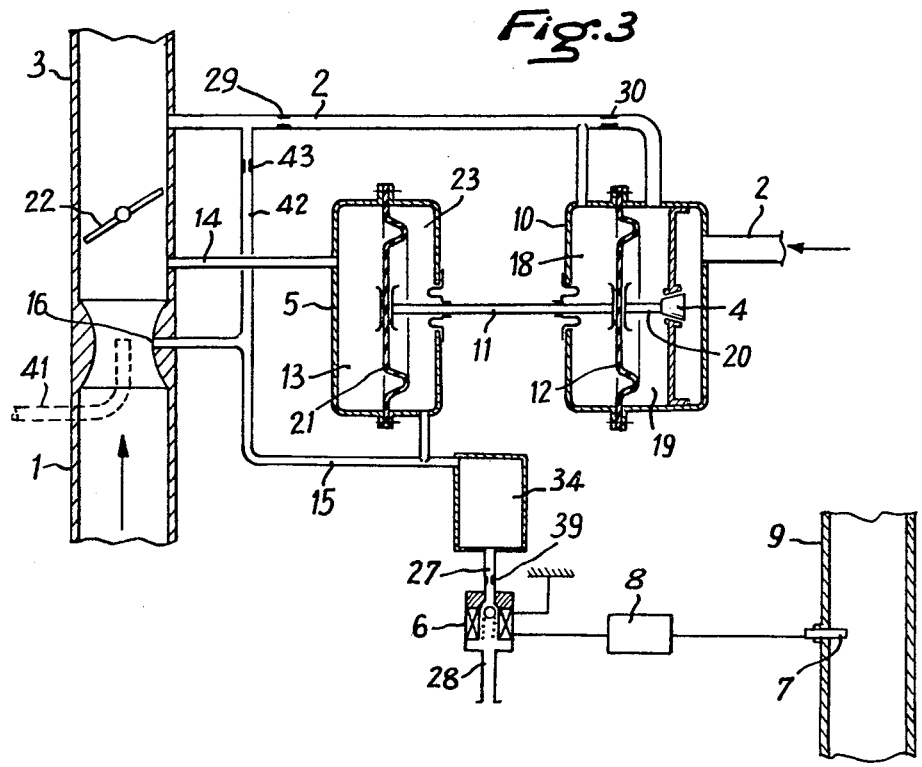
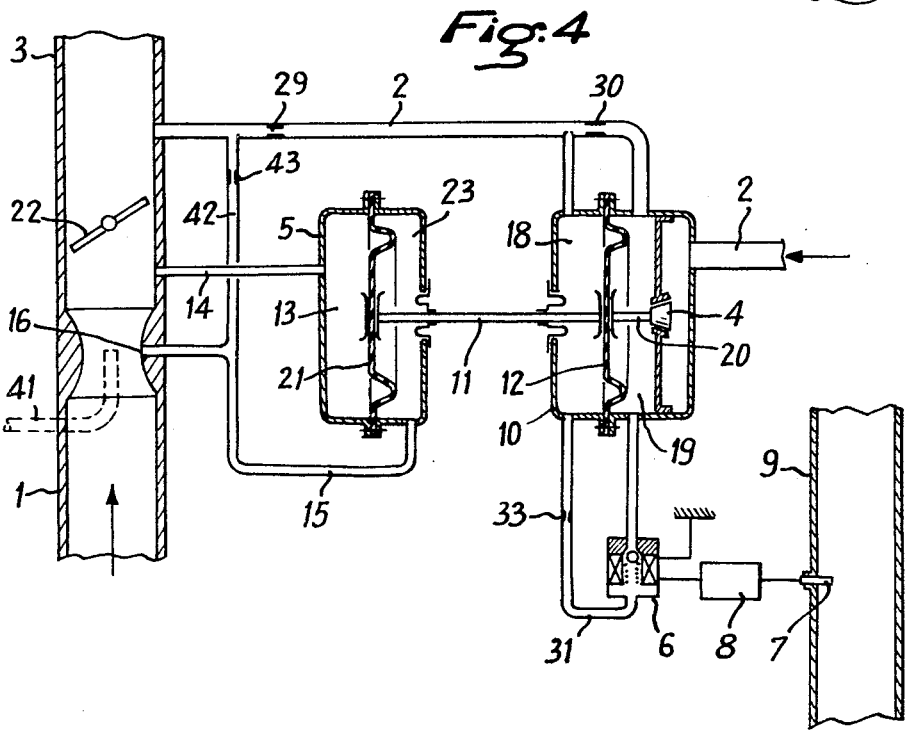

DEVICE FOR THE REGULATION OF THE FUEL-AIR MIXTURE OF AN INTERNAL COMBUSTION ENGINE

BACKGROUND OF THE INVENTION

1. Field of the Invention

The present invention relates to a device for the regulation of the fuel-air mixture of an internal combustion engine.

2. Description of the Prior Art

It is a known practice to regulate the air-fuel mixture of an internal combustion engine by acting on one or more of the parameters determining this mixture using the information from a probe arranged in the exhaust pipe which supplies the regulation device with an electric signal which is variable as a function of the composition of the gases burned.

In French Pat. Nos. 73.23453, 74.18029, 74.32606 it is disclosed that this regulation may also be modulated as a function of the amount of air passing through the carburettor by means of a capsule having a membrane or the equivalent which is subject to the reduced pressure prevailing at the venturi neck situated in the control device.

Internal combustion engines can be fed with various fuels and in particular gaseous fuel. In the case of liquid fuel, the regulation can be applied to the flow of liquid fuel supplied by a carburettor or the equivalent or to the air flow (oxidant) or alternatively to a secondary air flow as described in the above French Patents. In the case of gaseous fuel, substantial differences of structure appear. The carburettor or equivalent is in fact eliminated and the regulation is applied to an inflow of gas which directly provides a regulation of power by the variation of the quantity of gas admitted, whereas the liquid fuel devices must function close to stoichiometry.

SUMMARY OF THE INVENTION

The present invention relates to a device for the regulation of the air-fuel mixture of an internal combustion engine, the said device acting on the flow of a gaseous fluid, whether this fluid is an oxidant gas or a combustible gas.

The device according to the invention comprises two capsules each containing a movable element such as a membrane dividing the capsule into first and second chambers, the two capsules being arranged opposite one another and connected by an element mechanically connecting the movable elements, the first and second chambers of the first capsule being subject respectively to the static and dynamic pressures prevailing in this carburettor, the first and second chambers of the second capsule being subject respectively to the reduced pressure prevailing in the manifold and to this same reduced pressure regulated by the control valve of a gas inlet ending at said manifold, said valve being connected mechanically to the membrane of said second capsule, an electromagnetic valve controlled as a function of the composition of the gases burned by a probe arranged in the exhaust pipe acting on any one of the differences in pressure determining the functioning of either of the capsules.

When the fuel is a liquid, the gas inlet ending at the manifold will be a secondary air inlet; when the fuel is a gas, the said inlet will be the fuel gas inlet.

The system according to the invention may be mixed and in this case, the inlet will be the fuel gas inlet completing a lean mixture of air and liquid fuel.

The movable element may be any element capable of supplying information in response to a pressure difference and in particular includes a sliding piston, the faces of which are subject to different pressures.

The invention also includes the following arrangements:

(a) The movable elements of the two capsules and the gas inlet control valve are connected mechanically by a rigid link moving with said elements.

(b) The reduced pressure of the manifold is transmitted to each of the chambers of the second capsule via constrictions.

(c) According to a first embodiment, the electromagnetic valve subject to the probe is placed on a pipe connecting the second chamber of the first capsule to the manifold via a constriction.

(d) According to a second embodiment, the electromagnetic valve subject to the probe is placed on a pipe connecting the second chamber of the first capsule to an area of the inlet pipe in which the static pressure prevails.

(e) According to a third embodiment, the electromagnetic valve subject to the probe is placed on a pipe connecting the second chamber of the first capsule to the atmosphere.

(f) The said pipe as a buffer volume situated between the second chamber of the first capsule and the electromagnetic valve.

(g) According to a fourth embodiment, the electromagnetic valve is arranged in a pipe connecting the two chambers of the second capsule, a constriction being interposed between the first chamber and the electromagnetic valve.

(h) According to a fifth embodiment, the electromagnetic valve is arranged in a pipe connecting the first chamber of the second capsule to the atmosphere.

(i) The said pipe has a buffer volume situated between the said first chamber and the electromagnetic valve.

(j) An adjustable stop which permits the limitation of the closing travel of the gas inlet valve so that it maintains a minimum aperture.

(k) This adjustable stop is an elastic return device which permits the complete closure of the said valve when the return force of the capsules exceeds a predetermined value.

(l) The second chamber of the first capsule is also subject to the reduced pressure prevailing in the manifold via a constriction.

This arrangement permits the elimination of the disadvantages of the weakness of the dynamic reduced pressure prevailing upstream of the throttle valve when it is closed.

BRIEF DESCRIPTION OF THE DRAWINGS

The invention is described hereinafter with reference to the accompanying drawings.

FIGS. 1 to 5 show schematically five embodiments of the invention.

DESCRIPTION OF THE PREFERRED EMBODIMENTS

Figure 1:
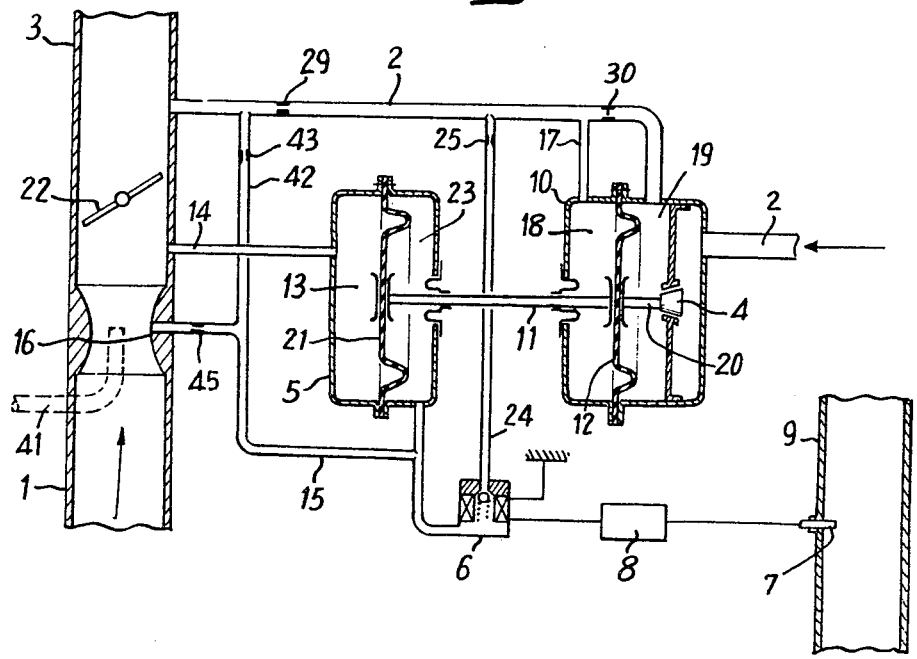

As shown in FIG. 1, an air inlet pipe 1 is provided with a venturi 16 (which can form part of a carburettor having a fuel inlet 41) and a control butterfly 22, downstream of which there is located a manifold 3 into which there opens a gas inlet 2 (secondary air or gaseous fuel). The manifold 3 conducts the air-fuel mixture to an engine (not shown).

Two capsules 5 and 10 having a membrane or the equivalent are mounted opposite one another and are connected by a sliding stem 11 linking their membranes 21 and 12; the first chamber 13 of the first capsule 5 is subject to the static pressure of the inlet pipe 1 via a pipe 14 opening upstream of the throttle valve 22, in an area where the static pressure prevails. The second chamber 23 of the first capsule 5 is subject to the dyanmic pressure of the pipe 1 via a pipe 15 opening at the neck of the venturi 16 with the interposition of a constriction 45. The first chamber 18 of the second capsule 10 is subject to the reduced pressure prevailing in the manifold 3 via the pipe 17; the second chamber 19 of the capsule 10 is subject to the reduced pressure of the manifold 3 regulated by the valve 4 which is connected mechanically to the membrane 12 by the stem 20 and which controls the gas inlet 2 to the manifold.

Constrictions 29 and 30 are provided between the chambers 18 and 19 and the manifold 3 to adjust the relative reduced pressures prevailing in the said chambers.

The device works as follows. The flow of air through the pipe 1 creates a force on the membrane 21 which is translated by a thrust, to the right, of the stem 11 and the opening of the valve 4. The flow of air in the manifold 3 and the opening of the valve 4 creates a force on the membrane 12 which is translated by a thrust, to the left, of the stem 11 and a tendency for the valve 4 to close. The assembly assumes a position of equilibrium such that the ratio between the flow of air in the pipe 1 and the flow of gas in 2 remains constant.

In the embodiment of FIG. 1, the regulation as a function of the composition of the combustion gases is operated by the modulation of the reduced pressure prevailing in the chamber 23.

An electromagnetic valve 6 is controlled by a probe 7 located in the exhaust pipe 9 via an electronic circuit 8. The said electromagnetic valve 6 is arranged in a pipe 24 connecting the second chamber 23 (dynamic pressure) to the manifold 3 via a constriction 25. In accordance with the information from the probe 7, the electromagnetic valve 6 opens, causing a further reduction of the reduced pressure in the chamber 23 and thus the opening of the valve 4, or alternatively it closes, causing the closure of the valve 4.

In the case of a petrol caburettor (schematised by the petrol inlet 41), the gas inlet 2 will be a secondary air inlet and the regulation according to FIG. 1 will operate by the impoverishment of the mixture supplied by the carburettor: when the mixture is too rich, the electromagnetic valve 6 opens, causing the opening of the valve 4 and the introduction of secondary air until the mixture is corrected.

In the event of the fuel being gaseous, the gas inlet 2 will be a fuel inlet and the regulation according to FIG. 1 will operate by the enrichment of the mixture; when the latter is too lean, the electromagnetic valve 6 opens causing the opening of the valve 4 and the enrichment of the mixture. In this case, the carburettor can be eliminated as can the inlet 41; but the device can also be used working with two fuels, a liquid fuel arriving at 41, and a gaseous fuel arriving at 2.

Figure 2:
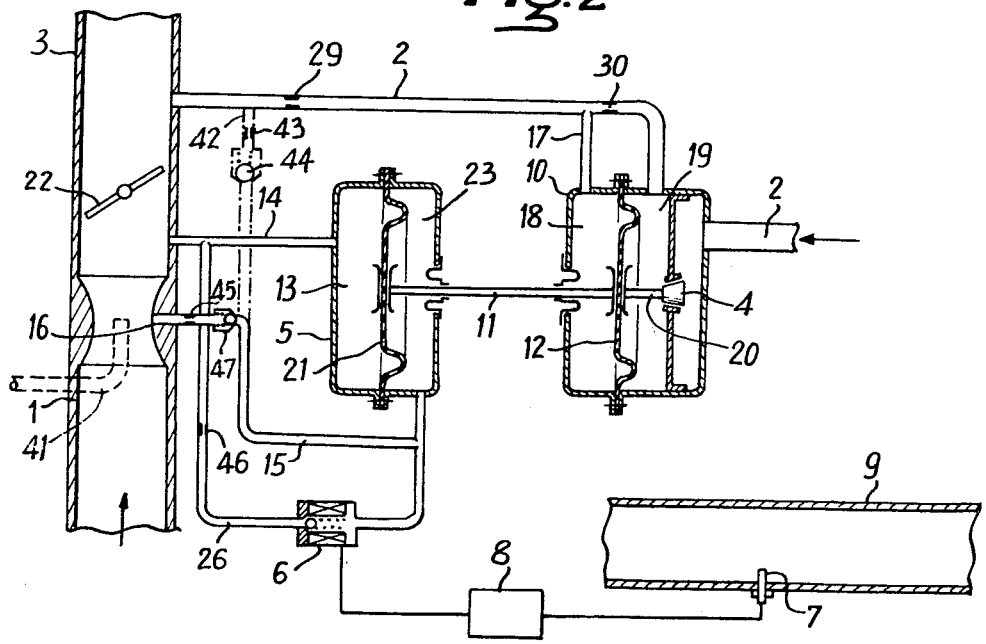

In the embodiment of FIG. 2, the electromagnetic valve 6 is arranged in a pipe 26 connecting the second chamber 23 to the first chamber 13 via a constriction 46: when the electromagnetic valve 6 opens, this causes an increase in the pressure prevailing in the chamber 23 and the closure of the valve 4, i.e. a reduction of the gas flow 2. A constriction 38 deadens pressure variations.

Depending on whether the pipe 2 is used to introduce secondary air or fuel gas, the regulation is therefore effected by the enrichment or impoverishment of the mixture.

In the embodiment of FIG. 3, the electromagnetic valve 6 is arranged in a pipe 27 connecting the second chamber 23 of the first capsule 5 to the atmosphere at 28 via the constriction 39. when the electromagnetic valve opens, the sub-atmospheric pressure in the chamber 23 increases, which brings about the closure of the valve 4.

Thus, as in FIG. 2, the regulation is effected by enrichment or impoverishment depending on whether the pipe 2 is an inlet for air or fuel gas.

In FIGS. 1 to 3, the electromagnetic valve acts by modulation of the dynamic reduced pressure present at 16 and acting on the capsule 5. However, with the device of the present invention having two capsules 5 and 10 it is also possible to apply the modulation of the electromagnetic valve 6 to the pressure difference prevailing between the chambers 18 and 19 of the capsule 10 and acting on the membrane 12.

In the embodiment of FIG. 4, the electromagnetic valve 6 is arranged in a pipe 31 connecting the chambers 18 and 19 of the capsule 10 with the interposition of a constriction 33. When the electromagnetic valve opens in response to information from the probe 7, it causes a drop in the pressure difference between chambers 18 and 19 and a tendency for the valve 4 to open.

Figure 5:
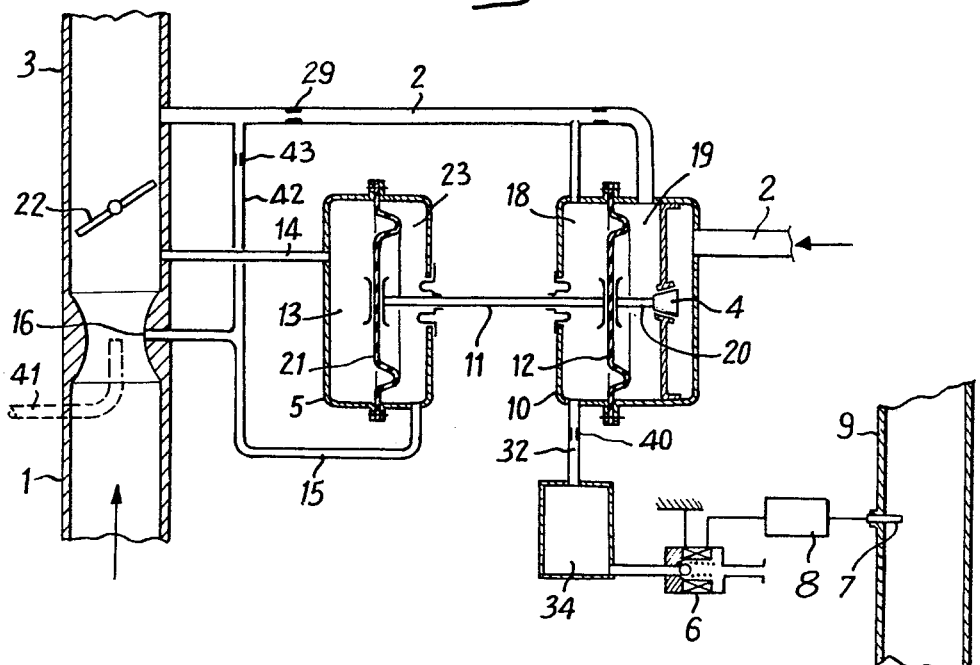

In the embodiment of FIG. 5, the electromagnetic valve 6 is arranged in a pipe 32 connecting the chamber 18 to the atmosphere via the constriction 40. When it opens it causes an increase in the sub-atmospheric pressure prevailing in the chamber 18 by causing a tendency to the opening of the valve 4, i.e. the impoverishment or the enrichment of the mixture depending on whether the pipe 2 is an air pipe or gas pipe as explained above in connection with FIG. 1.

In FIGS. 3 and 5, a buffer volume 34 is arranged in the pipe controlled by the electromagnetic valve 6, which itself is placed between the volume 34 and the opening to the atmosphere. The volume 34 dampens the action of the electromagnetic valve. This effect is obtained in FIG. 1 by the constriction 25 and in FIG. 4 by the constriction 33.

Figure 6:
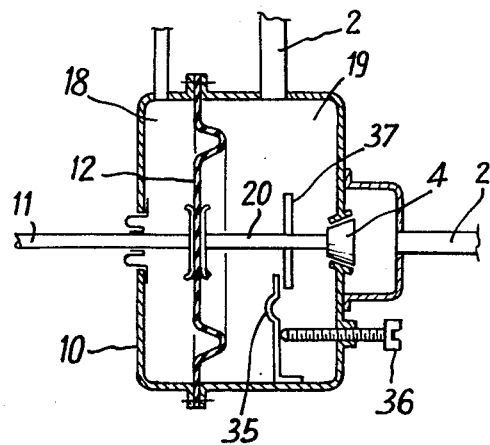
FIG. 6 shows schematically an embodiment of the second capsule having the object of providing slow-motion working.

When the closure of the valve 4 corresponds to an enrichment of the mixture, the control of the slow motion can be ensured as shown in FIG. 6, i.e. by means of a stop 35 limiting the closure travel of the valve 4 by working together with the ring or finger 37. Preferably this stop should be adjustable by means of the screw 36. Also preferably the stop 35 should be returned elastically towards the screw 36 but can move away from it under the action of the element 37 when the force on the stem 11 exceeds a chosen value, thus permitting the complete closure of the valve 4.

When the throttle valve 22 is closed, the dynamic reduced pressure in the venturi 16 is low and the level of energy supplied to the capsule 5 may prove insufficient for the correct functioning of the valve 4.

To solve this problem, arrangements are made to connect the chamber 23 to the manifold 3 via an auxiliary duct 42 suitably constricted at 43. This arrangement is shown in dotted lines on FIG. 2, and in unbroken lines in FIGS. 1, 3, 4 and 5. As shown in FIG. 2, the non-return valves 44 and 47 can be provided to prevent reverse circulation.

The multiplicity of possible embodiments shows the flexibility of the device which lends itself to varied arrangements. Another advantage of the invention is its simplicity, its reliability and its ease of control resulting from the fact that the whole of the device is reduced to the production of the capsules 5 and 10 which comprise practically no mechanical elements apart from a rigid connection between the membranes 21 and 12 of the valve 4.

From the design point of view it is easy to assemble the capsules 5 and 10 in a double capsule, comprising two interconnected membranes. Such arrangements belong to the realm of modern technology and are known to the skilled man.

The electronic circuit 8 should preferably be of the the type described in French Pat. No. 74.18028 in the names of the present applicants.

We claim:

1. A device for the regulation of the air-fuel mixture of an internal combustion engine comprising a inlet pipe having a venturi located therein, and an inlet valve located downstream of the venturi, the inlet pipe opening into a manifold, and an exhaust pipe, the device comprising:
   first and second capsules, each divided into first and second chambers by an element which is movable in said capsules in response to a pressure difference between said first and second chambers,
   the first and second chambers of said first capsule being subject respectively to the static and dynamic pressures prevailing in the inlet pipe upstream of the inlet valve, and the first and second chambers of said second capsule being subject to the pressure prevailing in the manifold,
   a connecting element connecting said movable elements,
   a gas inlet to the manifold,
   a control valve arranged in said gas inlet and connected to said movable elements,
   a probe arranged in the exhaust pipe for detecting the composition of the exhaust gases, and
   an electromagnetic valve for altering the pressure in one of the four capsule chambers in response to the composition of the exhaust gases.

2. A device according to claim 1, wherein said gas inlet is a secondary air inlet associated with a liquid fuel carburettor.

3. A device according to claim 1, wherein said gas inlet is a gaseous fuel input.

4. A device according to claim 1, wherein said movable elements and said gas inlet control valve are connected mechanically by a rigid link moving with said elements.

5. A device according to claim 1, wherein the reduced pressure of the manifold is transmitted to each of said chambers of said second capsule via constrictions.

6. A device according to claim 1, wherein said electromagnetic valve is arranged in a pipe connecting said second chamber of said first capsule to the manifold via a constriction.

7. A device according to claim 1, wherein said electromagnetic valve is arranged in a pipe connecting said second chamber of said first capsule to a zone of the carburettor body in which the static pressure prevails via a constriction.

8. A device according to claim 1, wherein said electromagnetic valve is arranged in a pipe connecting said second chamber of said first capsule to the atmosphere, said pipe having a buffer volume situated between said second chamber of said first capsule and said electromagnetic valve.

9. A device according to claim 1, wherein said electromagnetic valve is arranged in a pipe connecting the two chambers of said second capsule, a constriction being interposed between the first chamber and said electromagnetic valve.

10. A device according to claim 1, wherein said electromagnetic valve is arranged in a pipe connecting said first chamber of said second capsule to the atmosphere, said pipe having a buffer volume situated between said first chamber and said electromagnetic valve.

11. A device according to claim 1, further comprising an adjustable stop which permits the limitation of the closure travel of said control valve so that the latter maintains a minimum opening.

12. A device according to claim 1, wherein said second chamber of said first capsule is subject to the reduced pressure of the manifold via a pipe having a constriction.

13. A device according to claim 1, further comprising an electronic circuit for controlling said electromagnetic valve in response to an electrical signal from said probe.

14. A device according to claim 1, further comprising non-return valves arranged in the pipes connecting said second chamber of said first capsule to the venturi and to the manifold.

15. A device according to claim 1, wherein said movable elements are membranes.

16. A device according to claim 1, wherein said movable elements are pistons.

* * * * *